United States Patent [19]

Lewis et al.

[11] Patent Number: 5,294,792
[45] Date of Patent: Mar. 15, 1994

[54] WRITING TIP POSITION SENSING AND PROCESSING APPARATUS

[75] Inventors: Russell F. Lewis, Dallas, Tex.; Floyd H. Hollister, Pittsburgh, Pa.; Dale A. Cone, Garland, Tex.

[73] Assignee: Texas Instruments Incorporated, Dallas, Tex.

[21] Appl. No.: 816,330

[22] Filed: Dec. 31, 1991

[51] Int. Cl.⁵ .................. G01V 9/04; G09G 3/02; G06K 9/00
[52] U.S. Cl. ..................... 250/221; 382/13; 250/226; 345/163; 345/180
[58] Field of Search ............ 340/706, 707, 708, 710; 250/221, 227.13, 226; 382/13, 59, 3

[56] References Cited

U.S. PATENT DOCUMENTS

| | | | |
|---|---|---|---|
| 4,688,933 | 8/1987 | Capeyre | 340/707 |
| 4,751,741 | 6/1988 | Mochinaga et al. | 382/13 |
| 4,811,004 | 3/1989 | Person et al. | 250/221 |
| 4,856,077 | 8/1989 | Rothfjell | 340/708 |
| 4,922,236 | 5/1990 | Heady | 340/710 |
| 5,007,085 | 4/1991 | Gregnias et al. | 340/707 |
| 5,027,115 | 6/1991 | Sato et al. | 340/707 |
| 5,051,736 | 9/1991 | Bennett et al. | 340/707 |
| 5,107,541 | 4/1992 | Hilton | 382/13 |

FOREIGN PATENT DOCUMENTS

| | | | |
|---|---|---|---|
| 3143383 | 9/1982 | Fed. Rep. of Germany | 340/707 |
| 0120424 | 6/1985 | Japan | 340/707 |
| 0179820 | 9/1985 | Japan | 340/707 |
| 8604704 | 8/1986 | World Int. Prop. O. | 340/707 |

OTHER PUBLICATIONS

Tappert et al., "The State of the Art in On-Line Handwriting Recognition," IEEE Trans. on Pattern Analy. and Mach. Int. vol. 12, No. 8, Aug. 1990, 787-808.

Primary Examiner—Michael Messinger
Attorney, Agent, or Firm—W. Daniel Swayze, Jr.; Leo N. Heiting; Richard L. Donaldson

[57] ABSTRACT

A self-contained pen computer is provided that is capable of acquiring data representative of written strokes of the stylus of the pen and then recognizing the symbols associated with these pen strokes, or compacting these strokes. These recognized symbols or compacted strokes are stored in a memory contained in the pen and are transmitted via a transmitter contained in the pen to a host computer.

20 Claims, 5 Drawing Sheets

| HANDWRITING DETECTOR | | |
|---|---|---|
| MOVEMENT | UP/DOWN | PRESSURE |

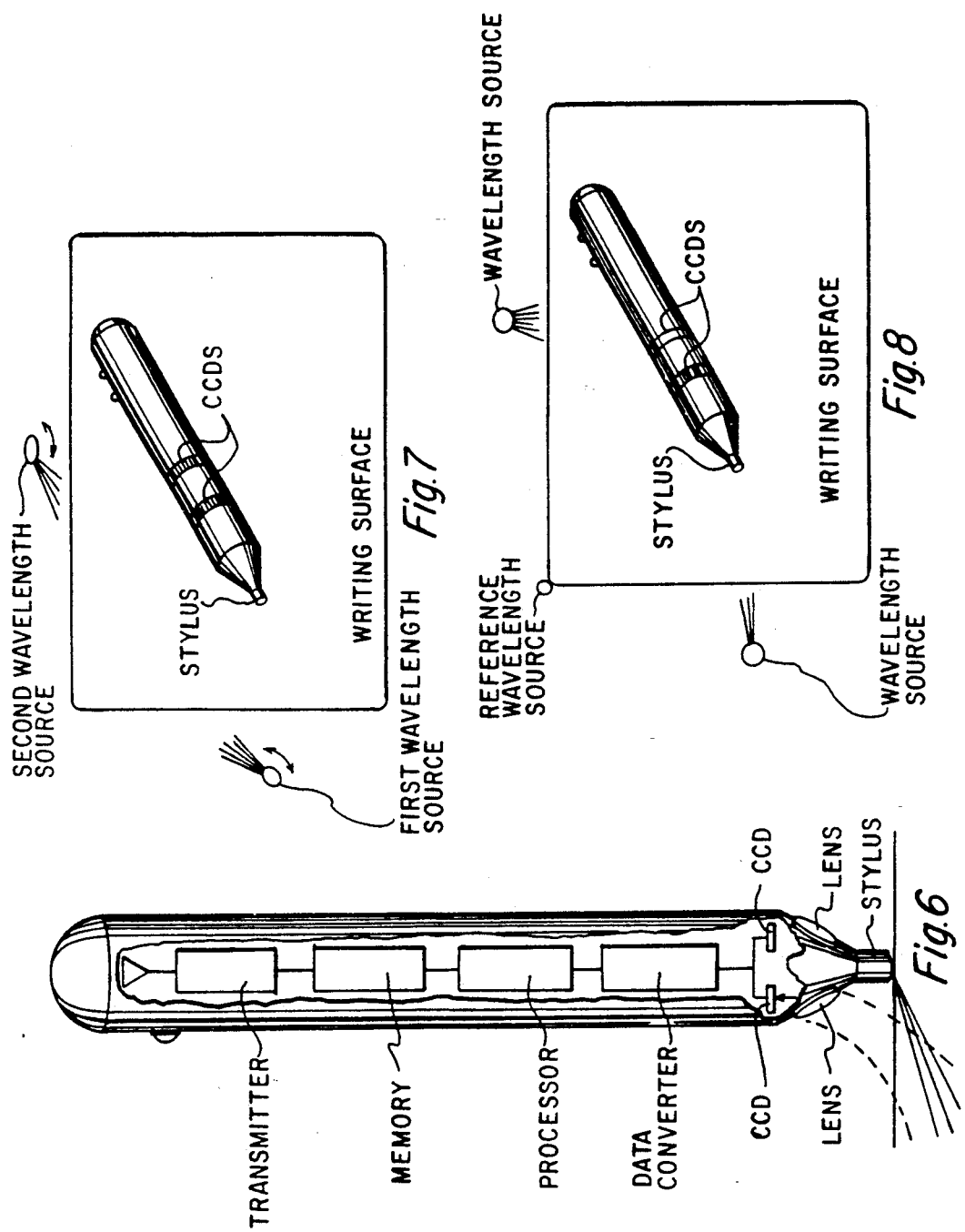

WRITING TIP POSITION SENSING AND PROCESSING APPARATUS

BACKGROUND OF THE INVENTION

This invention relates to a device for collection and assimilation of data, and more particularly, relates to a self-contained writing device that collects, recognizes or compacts data symbols, stores such symbols and transfers those symbols to a host computer.

Prior art data collection and recognition devices generally employ some sort of special writing surface on which a special stylus is applied and is limited to a particular character set or symbol set. Such prior devices are generally not very light in weight nor are they self-contained. Further, they require some sort of fixed physical interconnection with a host computer in order for them to be able to satisfactorily perform.

However, Texas Instruments has recently (summer of 1991) provided a commercial product that is approximately the size of a hand-held calculator and contains a small writing surface upon which handwriting may be sensed and recognized. This device also contains a screen that displays the recognized characters or symbols as they are written on the small writing surface. The recognized symbols may then be downloaded via a high speed RF or IR transmitter to a host computer for processing, and storage as an electronic audit trail. In addition, it contains a conventional numeric keyboard for performing arithmetic functions. Including the battery, this so-called audit terminal weighs about one pound.

There are various peripherals associated with personal computers such as keyboards, for example, which are cordless. That is, the keyboard is not physically connected to the host computer and does not require a physical wire for the keyboard to provide input to the computer. However, such cordless keyboards require constant monitoring of the screen of the computer with which they are to be used to ensure that the information that is being entered via the keyboard is being accurately and completely transmitted to the computer. There are also cordless pointers for computer generated displays used during a conference or meeting.

In addition, there are devices, such as a so-called mouse and/or track ball that are employed with a computer to enable a user to quickly move a cursor or piece of information at one location on a screen to another location. The mouse generally requires the directional movement of the mouse's roller across some flat surface and outputs a distance and direction traveled to the computer to move an element or cursor a corresponding distance on the screen. A track ball on the other hand is normally mounted on some fixed surface, such as an open area of a keyboard, and allows a user to manipulate or roll the ball with their fingers. In this manner, the amount of rotation of the track ball in a particular direction produces a corresponding directional movement of the cursor or material on the screen. The cordless pointer discussed hereinbefore, may include a small track ball for moving the cursor (or pointer) on the display.

There are also commercially available XY digitizing pads. In general, these XY pads require a physical wire between the pad and the computer with which they are to be used. These pads may employ bit mapped or vector techniques to convert the symbols written on their active surface area to signals that may be processed by a computer to determine what characters or data the written symbols represent. In addition, small such XY pads may be built into a portion of the surface of small hand-held calculators, or other devices (such as the foregoing described Texas Instruments device).

These and other disadvantages of the prior art are overcome by the present invention, however, and a new self-contained pen computer for the acquisition of, recognition or compaction of written data, and storage and transmission of such data is provided.

SUMMARY OF THE INVENTION

In accordance with a preferred embodiment of the present invention, a self-contained pen computer is provided that is capable of acquiring data representative of written strokes of the pen and then recognizing the symbols associated with these pen strokes, or compacting the acquired data. These recognized symbols or compacted data are stored in a self-contained memory in the pen and are transmitted via a self-contained transmitter to a host computer.

It is an object of the present invention to provide a self-contained pen computer for recognizing (or compacting) and storing symbols representative of strokes written by the pen and then transmitting these recognized symbols to a host computer.

These and other objects and advantages of the present invention will become apparent from the following detailed description, wherein reference is made to the figures in the accompanying drawings.

BRIEF DESCRIPTION OF THE DRAWINGS

FIG. 6 depicts another embodiment of the present invention that employs CCD scanning elements near the writing end of the pen to detect symbols as they are written on paper on any other surface, with the processing and storage of the detected symbols occurring within the pen and that may transmit such symbols to a host computer.

FIG. 7 depicts the use of selective wavelength sources associated with a writing surface to allow for location of the pen with respect to the light sources and thereby to detect symbols written by the pen, with the symbols processed and stored in the pen and transmitted to a host computer.

FIG. 8 depicts alternative arrangements for the use of selective wavelength sources to provide information to the pen computer on the symbols that are being written, with the symbols processed and stored in the pen and transmitted to a host computer.

DETAILED DESCRIPTION

Figures 1, 3:
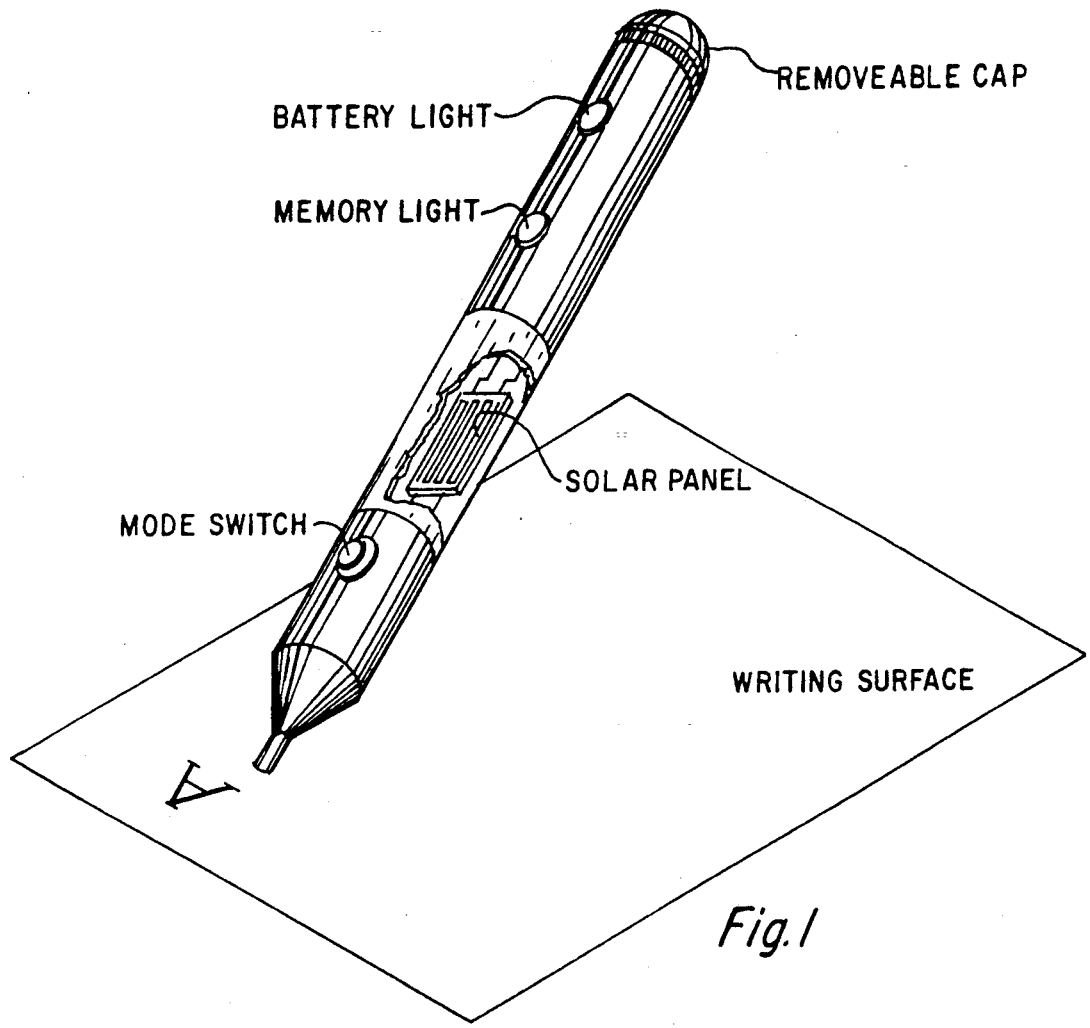
FIG. 1 depicts a presently preferred embodiment of the self-contained pen computer of the present invention writing a letter on a writing surface.
FIG. 3 depicts a simplified functional block diagram of the various types of inputs a handwriting detector employed in the present invention may provide.

Referring now to FIG. 1, there may be seen a preferred embodiment of a self-contained pen computer of the present invention for collection of written data associated with the use of the stylus of the pen. The recognition of such data (the letter "A" in FIG. 1) and conversion of the data into recognized characters, figures, drawings, and/or symbols is accomplished by at least one special computer processor or chip located in the pen. The terms "symbol" or "character" (either singular or plural) are used interchangeably herein to mean the data written by the pen stylus. Then the symbols are stored in a memory located in the pen. Alternatively, the data from the stylus may be compacted by the computer chip and then stored. The recognized or compacted symbols that are stored in the memory in the pen computer may later be transmitted by the user to a host computer (not shown) by means of a transmitter, also located in the pen. Optionally, the transmission may be on a continuous, real-time basis. These recognized or compacted symbols are received at the host computer by an associated host computer receiver and are either displayed on its screen, displayed and processed, or stored, as may be appropriate.

Continuing to refer to FIG. 1, it may be seen that the self-contained pen computer of the present invention has been employed to write the printed letter A on any writing surface. As also may be seen from this figure, the self-contained pen computer of the present invention also includes two external lights associated therewith. One of these lights is associated with memory status, i.e. the remaining storage capacity of the memory in the pen. The other external indicator is associated with the power status of the battery contained within the pen. That is, this external power light indicates when the battery is about to become exhausted and therefore operations with the pen must cease.

In addition, it may be seen that there is a mode switch on the exterior of the pen for changing the various modes in which the pen may operate. This switch may be a two-position push-button switch, or a selectable multi-position switch. Also depicted in FIG. 1 is a solar panel contained on one or more sides of the pen near the top of the pen. When exposed to interior or exterior light of sufficient intensity, the panel(s) provide power for the pen or charge the battery inside the pen, when the pen is not being used. At the non-stylus end of the pen is a removable screw cap which covers a multi-pin plug which may be used with a multi-pin receptacle plug associated with a host computer to download data and/or reprogram certain aspects of the internal operations of the pen computer, as described more fully later herein.

Figure 2:
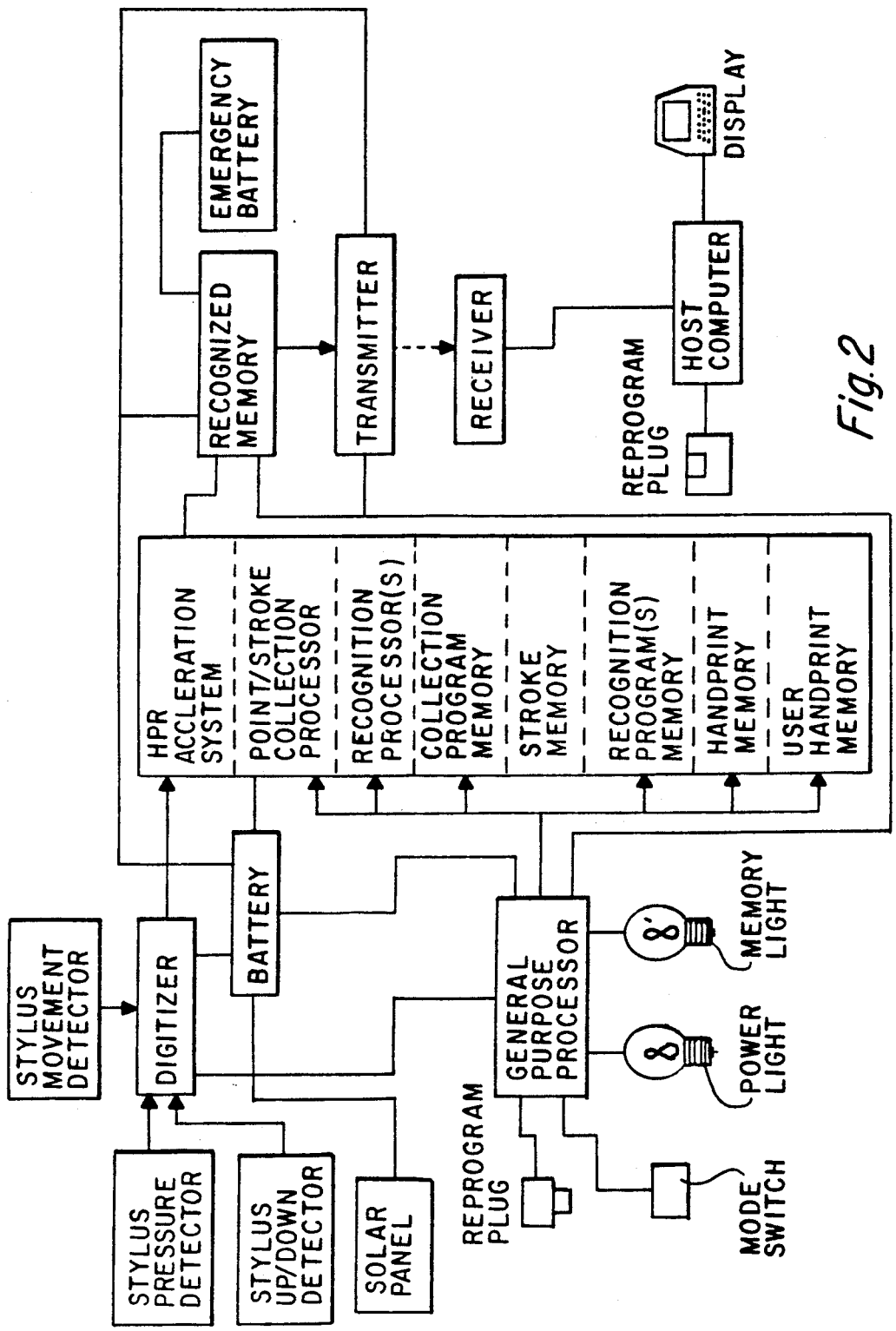
FIG. 2 depicts a functional block diagram of a preferred embodiment of the present invention.

Referring now to FIG. 2, there may be seen a general functional block diagram of the various internal and external components associated with a presently preferred embodiment of a self-contained pen computer of the present invention. More particularly, it may be seen that the self-contained pen computer of the present invention preferably employs a stylus movement detector, a stylus pressure detector, and a stylus up/down detector to provide appropriate signals to a digitizer. The digitizer then digitizes these signals which are representative of the movement of the stylus and correspond to the generation of characters (or data) on a piece of paper, or any other writing surface. The digitizer provides these digitized signals to a hand print recognition chip.

The hand print recognition (HPR) chip preferably contains at least two processors. One of these processors is a point/stroke collection processor and the other is a recognition processor. In addition, the HPR chip contains sufficient memory of any appropriate type to store collection program(s), stroke memory, recognition program(s), and data. Further, this memory may include appropriate libraries of information, such as a hand print memory for a specific user and a user independent hand print memory. In addition, a separate memory of sufficient size and type for storing recognized or compacted symbols may be included on the HPR chip. Based upon the operation of the point/stroke collection processor and recognition processor (or processors), as described more fully later herein, the HPR chip takes the digitized input signals and processes them to recognize the characters associated therewith, or compacts the data.

Once the HPR chip has recognized a particular character that character is then provided to a recognized memory in which it is stored. Alternatively, the HPR chip may not recognize the character and output to the memory a compressed bit map or other compressed representation of the character or data. At some point in time, the recognized memory may become full, or nearly full, at which point in time an external indication, such as a light and/or a sound generating device, may begin to indicate this fullness of memory so that the user knows that it is time to download the memory to the host computer. The amount of recognized memory in the pen determines the length of time the pen may be used to generate data before it must be downloaded.

Once the user decides to download the recognized memory to the host computer, the pen computer of the present invention may be "pointed at" the user's host computer which includes therein a receiver compatible with a transmitter also included in the pen computer. Alternatively, once the memory is nearly full, or full, the pen may automatically download the stored data to the host computer; this may require a "hand-shake" type of communications protocol to ensure the host computer receives the data as it is sent. The user's host computer may be a PC, a minicomputer, a main frame, a portable, or a laptop computer. The transmitter in the pen will then transmit to the receiver of the host computer a serial stream of data corresponding to the recognized or compacted characters stored in the recognized memory. The data is preferably transmitted using a high message content protocol. The host computer may then display these characters on its screen display, perform certain operations on the data as it is received and display the results on the display screen, route the data to an internal memory associated therewith, or any combination of these actions.

In this manner, the pen computer of the present invention takes recognized or compacted written characters that have been written upon a writing surface and transmits them to a host computer where they may be suitably displayed, processed, or stored. Thus, the self-contained pen computer of the present invention serves as a remote, independent, portable, smart data input device that may be later used to transfer any input data to a host computer without the use of a physical wire. Alternatively, the programming plug of the pen and its associated receptacle tied to the host computer may be employed to download the data from the pen computer into the host computer. That is, the pen computer of the present invention may provide inputs to a host computer, which may be a laptop PC, such as disclosed in copending application Ser. No. 07/815,685, filed on Dec. 31, 1991 (the same date as the present application), entitled "Improved Computer Keyboard and Position Indicating Device," by Thomas R. Grimm and La-Vaughn F. Watts, Jr. and assigned to Texas Instruments Incorporated.

In addition to the aforementioned components inside the pen computer of the present invention, there may also be seen a general purpose processor, which is employed to oversee the operations of the other circuitry or components employed by the pen computer of the present invention. Although depicted as a separate general purpose processor, the point/stroke collection processor, as described later herein, is a general purpose processor and may be employed as the general purpose processor depicted in FIG. 2, as well as the point/stroke collection processor. More particularly, the general purpose processor is at least programmed to monitor the status of the battery and provide an appropriate external indication, such as a light and/or sound from a sound generating device, of the remaining power status. Such a light may be programmed to be steady during normal operations, and flashing when the battery is nearly discharged (i.e. a more slowly flashing light representing a more nearly discharged battery). Alternatively, the sound generating device may intermittently or continuously produce a "beep" or "click" sound to signal a low battery condition. In addition, it may be seen that the general processor may also control the digitizing cycle or interval of the digitizer, when present.

In addition, the general purpose processor is also depicted as interfacing with the various memory portions of the HPR chip. In this manner, the general purpose processor by means of a reprogramming plug, may unload and reload programs into either the collection program memory or the recognition program memory. The general purpose processor may also be employed via the reprogramming plug to load different libraries associated with a specific user, or user independent libraries, for hand print recognition. In addition, the general purpose processor via the reprogramming plug may be also employed to modify modes, to make adjustments to the operations and processing steps of the recognition processor, or processors, as well as the point/stroke processor. As also depicted in FIG. 2, the general processor also may control the operations of the transmitter and the recognized memory. For example, the memory contents may be downloaded, via the reprogramming plug and general purpose processor, to the host computer.

Also depicted in FIG. 2 is a receiver associated with a user's host computer and a screen display associated with that host computer. Since the transmitter in the pen is a low power device, the receiver should be a very sensitive receiver, and employ an antenna that is as omnidirectional as possible. In addition, a reprogramming plug receptacle is attached to the host computer. This receptacle mates with the plug associated with the pen computer of the present invention to allow the host computer to download handwritten data, configure the pen in particular modes, and/or to reprogram the libraries or programs used by the various processors within the HPR chip.

The general purpose processor may control the various modes of operation of the pen computer of the present invention in response to an external mode switch. For example, the general purpose processor may, in response to the movement of a switch on the exterior of the pen computer, shift the transmitter to a continuous transmit mode. The switch may be a two-position push-button type switch, or may be a selectable multi-position switch of the push or rotary type. In this manner, as characters are generated by the stylus they are digitized, recognized (or compacted) by the HPR chip, provided to the recognized memory which immediately supplies to them to the transmitter where they are transmitted. In this manner, the characters are generated and transmitted in real-time by the pen to the host computer, where they may be either displayed, processed and/or stored.

This continuous transmission mode may be particularly useful, for example, when the pen is used as part of the generation of figures, notes, and/or drawings associated with a meeting during which the notes, figures and/or drawings are provided on an overhead screen as they are generated. Such a meeting room will require a receiver to receive the signals from the pen (or pens) in use by the user(s) and a host computer to generate the figures, notes, and/or drawings and, via a projector device, project these symbols onto a screen for viewing by the various users.

Alternatively, the mode switch may be placed into a store position, in which case the transmitter only transmits the data from the recognized character memory in response to the pushing of the mode switch to a transmit position. In addition, the external mode switch may, after appropriate programming of the general purpose processor, be employed to shift between various other types of modes. Such other types of modes might include a mode where the pen recognizes only a particular user's handwriting and will not operate for any other user. The configuration of the pen computer in the various modes may also be accomplished via the reprogramming plugs and the host computer. That is, the mode switch may be entirely or partially a software "switch". For example, an external mode switch may be employed by the user to turn "on" the pen computer, after which the user may write a programmable password (or pass-symbol) for the pen to become fully operational and then write a number, letter, and/or short phrase to shift the pen computer into the desired mode of operation. That is, the mode "switch" may also be a symbol, letter, number, or short phrase.

In addition, in another mode, the general purpose processor may control the operation of the recognized memory when the memory becomes full and the user has not downloaded the memory. That is, the general purpose processor may be programmed, or in a mode, to shut down the pen data collection activities after the memory becomes full or, it may be programmed, or in a mode, such that the pen continues to operate and the data wraps, i.e. the memory begins to store the newest data on top of the oldest data, or the data is automatically downloaded to the host computer. In another mode, the general purpose processor may control the communications protocol employed by the transmitter. For example, in one mode the transmitter might transmit a packet of data with a unique user identification "number" at the start and/or end of each packet; this might be a "conference" mode. In another mode, the transmitter might transmit only packets of data; this might be a "local" mode. Other types of communications protocols, such as a "hand-shake" type of protocol, may also be selected by appropriate programming of the general purpose processor and/or transmitter. The general purpose processor may also monitor the activity or use of the pen and power down selected components when the pen is not used for a preprogrammed, selectable period of time, i.e. a "sleep" mode.

In order to ensure that the characters stored in the recognized memory will remain stored, even in the event of an inadvertent loss of power, it is presently preferred that the memory include a small emergency battery to allow the memory to continue to operate even if all of the other circuitry within the pen computer of the present invention fails because of a low or no power condition.

A battery is preferably employed to provide power to the circuits and components of the pen computer of the present invention. Alternatively, two such batteries may be employed, with one acting as an emergency supply when one is exhausted. The user would then be prompted, via an external indication, such as an external light and/or sound, to replace the discharged battery with a fresh battery. An indicator inside the pen could be employed to indicate either the good or discharged battery, so that the internal circuits and components of the pen would not have their power interrupted even during battery replacement. The battery may be a hearing aid battery, or any other suitable lightweight, high power battery.

Optionally, a solar panel (or a plurality of solar panels) may be employed at or near the non-writing end of the pen computer of the present invention to allow for the operation of the pen or a charge of the battery from the illumination inside an office, or wherever the pen computer of the present invention may be employed. In this manner, the solar panel supplies the power necessary for the normal operation of the internal circuitry of the pen computer of the present invention until the solar panel is not exposed to a source of radiation sufficient to provide this power. When the solar panel is unable to provide sufficient power, the battery begins supplying the power to the internal circuitry. The solar panel may charge the battery when the pen computer is "off" and is exposed to appropriate radiation.

That is, the present invention provides a self-contained pen computer that a user may employ to write on any surface or a particular surface. The self-contained pen computer collects the written data preferably from sensors associated with the stylus or writing tip of the pen and this data is fed into a recognition chip which is contained within the pen that translates the data into recognized symbols, or compacts the data. Such a recognition chip is described in pending U.S. patent application Ser. No. 07/729,534, filed on Nov. 12, 1991 and assigned to Texas Instruments Incorporated, and is incorporated herein by reference. These recognized symbols or compacted data are then stored in a recognized memory also inside the pen. After the user has accumulated sufficient data in the memory, the user may then download the symbols or data that are stored in the memory to a host computer by means of the transmitter in the pen. When the memory is full of data, the data either wraps around, the pen shuts down and accepts no more input, and/or the pen may automatically download the stored data to the host computer.

The memory may also have associated therewith an external indication, such as a light on the surface of the pen, that indicates when the memory is nearly full or full. The transmitter may be an infrared (IR) or radio frequency (RF) transmitter, and is preferably a low power and intermediate to low pulse speed transmitter.

The self-contained pen computer of the present invention may be employed for signature verification, transcription of meeting notes and drawings, generation of displayed meeting notes or drawings, notes in the margin of a document, notes in general, CAD designs, form information generation and/or authorization, symbolic calculations, and/or remote processing. By remote processing it is meant that a user writes a symbol on a piece of paper and the answer appears on tee screen of the host computer. For example, a user might write the square root of 768 on a piece of paper and the answer of 27.7128 would appear on the host computer screen.

Referring now to FIG. 3, there may be seen a simplified functional block diagram of the various types of inputs a handwriting detector employed in the present invention may provide. More particularly, there may be seen a handwriting detector function which provides the movement, contact and pressure of the stylus or writing tip on a writing surface. This may be accomplished by one or more appropriate detectors on or in the surface of a special writing area, or more preferably, one or more appropriate detectors inside the pen computer of the present invention. In general, the movement function provides stroke lengths, sizes and shapes to the recognition chip; the movement function may also include velocities and accelerations and provide them to the chip. The up/down function is to detect the pen stylus on the writing surface ("down"), or off of the writing surface ("up"). The pressure function is to detect the amount of force between the stylus and the writing surface. It has been found that the force is representative of emotional state and is a useful input for the recognition chip. As a minimum, digitized inputs corresponding to the movement and up/down functions are provided to the recognition chip. Any type of handwriting input device or devices may be employed in the pen computer of the present invention.

For example, the pressure function may be determined by a piezoelectric sensor disposed between the body of the pen and a separate stylus or writing tip containing portion of the pen. In a similar manner, three orthogonal axes accelerometers located at the stylus end of the pen may be employed to provide the movement and up/down functions. These functions are then provided to the remainder of the pen components, which may be digitized by a digitizer also contained in the pen. For example, outputs from analog sensors must be digitized and a digitizer is required; for digital outputs from digital sensors, a digitizer is not necessary, but may still be included to allow for selective replacement/updating of input sensors.

Figure 4:
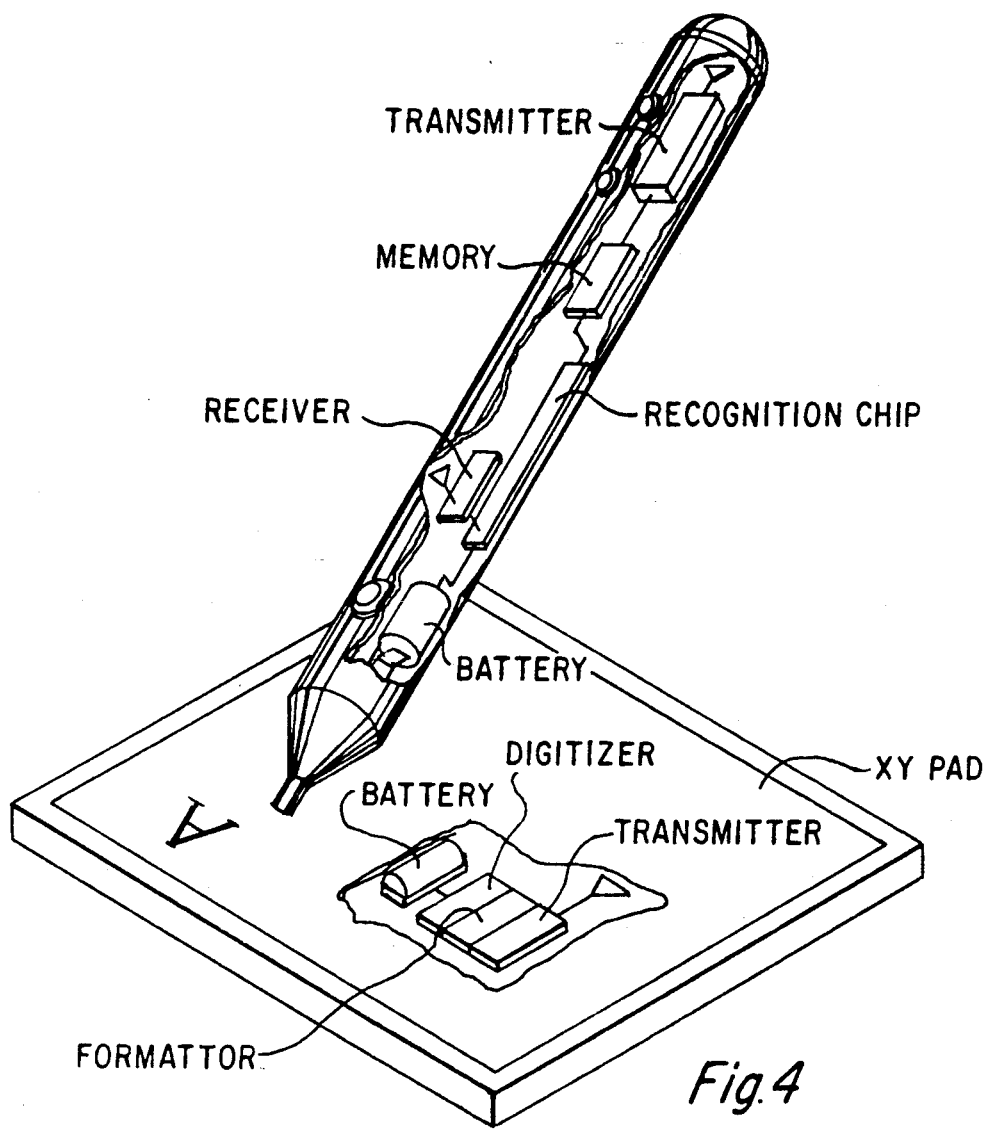
FIG. 4 depicts an embodiment of the present invention that employs a conventional XY digitizing pad coupled to a pad transmitter to transmit the digitized signals representing symbols written on the pad by the pen to a receiver contained in the pen where the symbols are processed and stored in a memory for transmission by a transmitter in the pen to a host computer.

Referring now to FIG. 4, there may be seen a simplified depiction of one embodiment of a pen computer of the present invention. More particularly, it may be seen that there is an XY pad having a digital output upon which a pen computer of the present invention is operated. The XY pad may be sized to be covered by a sheet of paper (or form) of any convenient size upon which notes or information are entered, to provide a hard copy and an electronic copy of the notes or information. The XY pad may include a digitizer, and optionally a formatter to determine whether the pen is up or down, i.e. on or off the surface of the XY pad. This pad may be an XY array of very small pressure sensitive detectors that output a voltage as a pen or other stylus contacts them with a light contact pressure. In this manner, each stroke will generate a plurality of voltages from the detectors contacted during that stroke. The resulting XY positions may be compacted to a start position and an end position, with a distance of a known number of units, for a straight line. A curve may be represented by a plurality of segmented lines. The number and size of pixels in the X and Y directions determine the "sensitivity" of the pad to the size of the handwriting. For such a pressure sensitive XY array, a formatter may not be necessary.

The XY pad also includes a pad transmitter and an appropriate power source, such as a lightweight, high power battery. For some embodiments, the recognition chip may be included in the XY pad. The pad transmitter transmits the signals from the digitizer, which are digitized signals representative of the symbols being drawn on the XY pad. Preferably, this data is transmitted on a continuous, real-time basis; however, it may be stored and transmitted upon user request, or after some preselected short interval of time. These digitized signals are received by a pen receiver in the pen. Again, both the pen receiver and pad transmitter may be either an IR or RF transmitter/receiver pair.

In the simplest embodiment of the present invention, the digitized signals are provided to a separate memory included in the pen and when the memory is full, these signals are provided to a host computer via a separate transmitter included in the pen. That is, the pen is at least a portable storage device, while the XY pad may be fixed or portable. Preferably, however, a recognition chip is included inside the pen, which then determines from the digitized signals what the symbols are and stores these symbols in the separate memory. When the recognition chip is in the pen, an input buffer between the receiver and chip may be employed; the size of the buffer is dependent upon the rate and speed of transmission and processing. Alternatively, the digitized signals are compacted and stored in the memory. These stored signals are transmitted by a transmitter inside the pen to a receiver associated with a host computer.

Also associated with the separate memory is an external indication to identify when the memory is full or nearly full, i.e. indicating to the user that the memory must be downloaded to the host computer at that time. Alternatively, the full, or nearly full indication may also trigger an automatic transmission of the stored data to the host computer using a "hand-shake" transmission protocol. The memory may be serial oriented memory. The external indicator for the memory may be a light that is programmed to blink with an increasing frequency as the memory's capacity is being filled and to go to a steady indication upon nearly full capacity of the memory, or it may be a "beep" sound or a continuous tone.

A general purpose processor to oversee all the operations, monitor the battery status, monitor the memory capacity, download data, reprogram transmission protocols, change modes, and reprogram recognition chip libraries and/or programs, is also preferably provided. This general purpose processor may also be located on the HPR chip. That is, the general purpose processor may be used to unload and reload programs and libraries associated with the recognition chip, as described more fully later herein. In addition, a hearing aid battery, or any other suitable lightweight high power battery, is included within the pen to provide power to all the foregoing described electronic circuitry. A separate external visible indicator, such as a light, for low power is also preferably provided and operates as described earlier herein. Alternatively, a sound generating device may be employed to generate the external indication of a low power condition.

The special recognition chip is described in the aforementioned pending patent application as a hand print recognition (HPR) accelerator system. More particularly, the recognition or HPR chip includes a point/-stroke collection processor with a collection program memory for storing collection programs used by the collection processor. The collection processor may be either an 8 or 16 bit digital processor, similar to those of the TMS 370 family of digital processors sold and manufactured by Texas Instruments Incorporated. The collection processor receives the digital signals representative of a digitized series of points from the input device (or devices), or signal conditioning circuitry. The collection processor "cleans" and "thins" the set of input data signals and converts the digitized points to vector stroke data. The conversion from digitized input signals to vector stroke data is a form of data compaction. The vector stroke data is then output to a stroke memory.

The programs necessary to perform the functions described for the collection processor may be stored in the collection program memory, which is approximately 5 to 20 kilobytes of memory, although more or less memory may be so employed. The collection program memory may be random access memory, EEPROM memory, or any other type of memory. The collection processor is preferably a general purpose type processor which may be programmed to allow for a wide variety of data input signals and formats from a wide variety of input devices. The programs stored in the collection program memory may be programmed during the manufacture of the recognition chip using conventional EEPROM (or flash EPROM) technology. Alternatively, the collection program memory may be random access memory so that it may receive new collection programs and allow for new input devices with differing data input formats. Thus, the collection processor may receive data in a variety of input formats and output stroke data in a format recognizable by the remainder of the portions of the recognition chip.

The stroke memory may be a buffer for temporary storage of the vector stroke data and is approximately 100 to 500 bytes of random access memory, although more or less memory may be so employed.

The vector stroke data stored in the stroke memory is output as needed to a recognition processor which utilizes recognition programs stored in a recognition program memory. The recognition processor may be a processor similar to the 16 or 32 bit digital processors of the TMS 320 line of digital signal processors sold and manufactured by Texas Instruments Incorporated. The recognition processor may use known recognition algorithms to compare the vector stroke data received from the stroke memory to libraries of known stroke data stored in a user dependent hand print memory or a user independent hand print memory. The stroke data may be conventional characters and numbers as well as specially defined gestures, shorthand symbols, or the like, indicating particularly defined specific functions.

The user dependent memory may be about 10 kilobytes of random access memory, or any other type of memory, for the printed characters associated with a specific user, or about 100 kilobytes of memory for cursive characters, although more or less memory may be so employed. As is well known in the art, a data processing system, such as the user's host computer, may be employed to train the recognition chip to recognize a particular user's own handwriting. Such a data processing system is used with a training program to generate a user specific library and for then loading a set of recognized characters into the user dependent hand print memory of the pen.

The user independent hand print memory is approximately 50 kilobytes of random access memory, or any other type of memory, and stores a variety of samples of hand printed characters, gestures, and shorthand or other special symbols, although more or less memory may be so employed.

The recognition program memory is about 20 kilobytes of program memory for conventionally printed material, or about 256 kilobytes of program memory to hold programs for recognizing cursive characters, although more or less memory may be so employed. As noted hereinabove, the recognition program memory may be random access memory, EEPROM memory, or any other type of memory. Thus, the recognition program memory may be programmable during the manufacture to contain predetermined recognition programs using EEPROM memory. Alternatively, the recognition program memory may be random access memory to allow for the reception and storage of new recognition programs as different recognition algorithms are developed, or as required for a particular application.

The recognition processor compares the vector stroke data received from the stroke memory and outputs a digitally coded character in a format recognizable by a general purpose processor. The data representing the recognized character is output to an output memory, which may be about 100 bytes of random access memory to act as a buffer between the recognition processor and the separate recognized memory. The output memory may also be significantly larger than this so that it may store a bit map of a large number of characters. Various conventional compression algorithms may be used to compress the bit map of any recognized characters prior to storage in the recognized memory. The recognized memory may be any type of memory and is preferably at least 1 megabyte of memory, although more or less memory may be so employed.

Preferably, a plurality of recognition processors, each operating in parallel on the vector stroke data received from the stroke memory are provided. The use of a plurality of parallel recognition processors allows for the parallel use of different recognition algorithms on the same stroke data. Further, the use of a plurality of parallel recognition processors allows for the parallel comparison of a single set of stroke data to different character libraries or memories, such as a user dependent or user independent library or memory. Alternatively, a single memory may be subdivided and used by the parallel processors.

In addition, the use of a plurality of parallel recognition processors allows for the use of different algorithms in different processors using different recognition libraries. The use of parallel recognition processors also allows for the optimization of a particular recognition algorithm with a particular type of character data. Further, the use of parallel recognition processors allows for an increase in the amount of character memory scanned for each character input (vector stroke data), thereby increasing the speed of the recognition operation and the accuracy of the entire system. In general, the various libraries are configurable by the particular recognition program used.

The data output by the various recognition processors may be any type of data and preferably is a conventional ASCII character code. Due to the programmable nature of the recognition processor, as well as the collection processor, the recognition chip is adaptable to a wide variety of input devices and general purpose processors. Further, by altering the programs used to operate the collection processor and/or the recognition processor, virtually any type and format of input data and output data may be used and generated, respectively, by the recognition chip.

For use in the pen computer of the present invention, the circuitry described as the recognition chip or HPR chip is preferably formed on a single semiconductor substrate to allow for a monolithic recognition chip. The collection processor and recognition processor may be constructed on such a single chip using known methods. The amount of program and data storage memory may also be located on this single chip using known methods. However, it should be understood that the types and class of processors previously described (TMS 320 and TMS 370 classes of processors) are for description purposes only. In addition, it should be understood that the incorporation of the recognition processor and collection processor into a single monolithic system would also allow for the elimination of a large amount of circuitry within these types of processors. More particularly, these processors contain a large amount of I/O circuitry and control signals which are not necessary if the processors are incorporated into a single monolithic system. The elimination of this excess circuitry is also accomplished using methods well known in the art.

Figure 5:
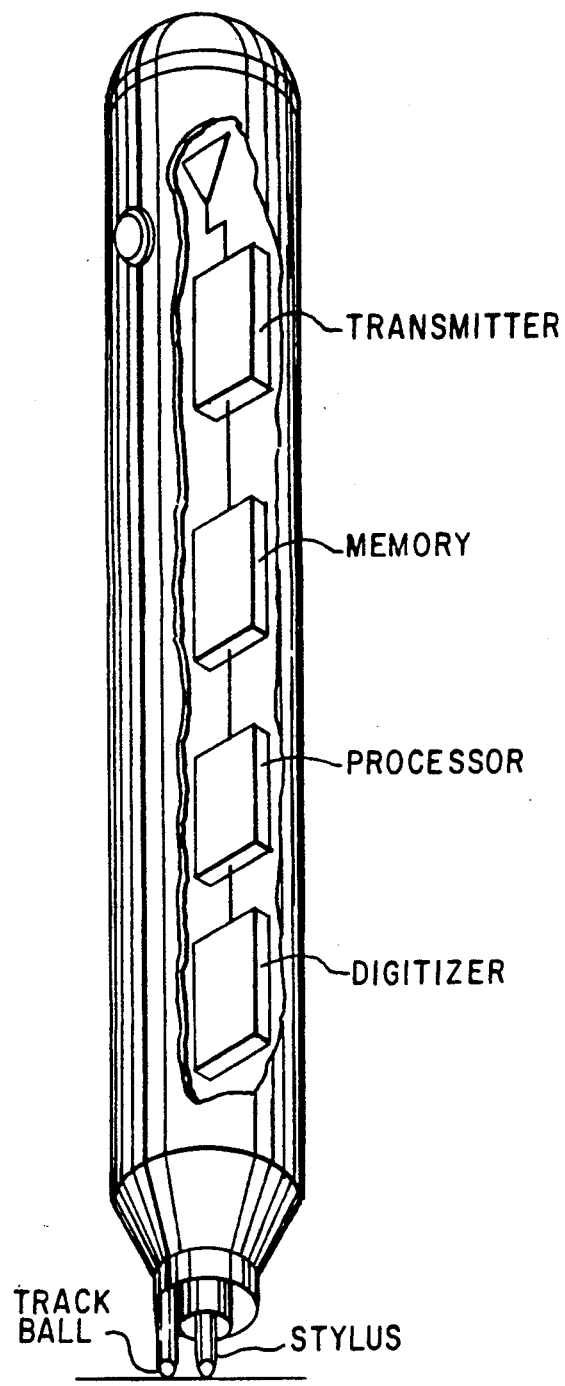
FIG. 5 depicts an alternative embodiment of the present invention that employs a mechanical follower and digitizer which are contained within the pen to provide inputs which are processed and stored in the pen and may be transmitted to a host computer.

Referring now to FIG. 5, there may be seen an alternative embodiment of the self-contained pen computer of the present invention. More particularly, for this embodiment, the data detection, digitizer and pen up/-down detector are included within the pen. The data detection is accomplished by a mechanical follower that tracks the stylus movement of the pen and provides signals to a digitizer to indicate the symbols that are being drawn by the pen stylus. In a similar manner, the mechanical follower may be springloaded so as to provide a pen up/down detection signal as well. The mechanical follower may be a very small inverted track ball that "follows" the stylus and is free to rotate 360 degrees.

The digitized signals from the digitizer are provided to a recognition chip where the digitized signals are recognized and converted into symbols (or compacted), which are then stored in the memory. The memory again has an external memory full indication. The memory in turn is connected to a pen transmitter for transmitting the recognized or compacted symbols to a host computer as described earlier herein.

Referring now to FIG. 6, there may be seen yet another embodiment of the pen computer of the present invention. More particularly, for this embodiment of the pen computer, capacitively coupled device (CCD) scanning elements are employed to detect the symbols on the paper written by the stylus of the pen. For this embodiment, a ring of CCDs are placed near the stylus end of the pen. A suitable lens system (that is blended into the exterior of the pen) provides the ring of CCDs with a very narrow field of view immediately adjacent the pen stylus. In this manner, as the stylus makes a mark on a writing surface that mark is detected by one or more CCDs and converted by the digitizer into a peak voltage localized to a particular position relative to an arbitrarily assigned "up" (or zero degrees) position. An infrared (IR) light emitting diode (LED) mounted in or on the exterior of the pen near the writing end may provide illumination for the CCDs if the incident light level is too low for the CCDs to operate satisfactorily.

Thus, as the CCD ring's pulsed output is provided to the digitizer, it represents a line detection and relative position, as well as a relative length based the number of occurrences (which depends upon the CCD clocking rate) at that same relative position. In this manner, lines, their crossings and other suitable types of input data may be supplied to the recognition chip for analysis and recognition, or compaction. Alternatively, the signals from the CCD scanning elements may be in turn fed to a data converter, which is analogous to the digitizer of the earlier described embodiments, and then supplied as the input data signals to the recognition chip. The remainder of the operation of the pen computer is as described hereinbefore.

The CCD embodiment of the pen computer of the present invention may be particularly useful for recording information and/or authorizations for particular types of forms. If the data is stored along with a time stamp, i.e. a time and date of the storing, it possible to correlate receipt of information and/or authorizations. For example, a specific form could have a bar code at its top that could be scanned by the CCDs and stored to identify what information was written on that form and when it was authorized by a signature. This would provide a hard copy form, as well as an electronic audit trail with the time stamped information and/or authorization for that form.

Referring now to FIG. 7, there may be seen a writing surface having disposed adjacent to the writing surface two independent separate wavelength illumination sources. These two wavelength sources are employed to detect the symbols that are being drawn by the pen, i.e. the movement and up/down functions. More particularly, each of the separate wavelength illumination sources have a beam that sweeps the writing surface at a preselected frequency. The pen computer contains two rings of CCDs, or any other type of 360 degree sensor, for the two wavelength sources located near the writing end of the pen. These sensors detect the sweeping beams from the two wavelength sources and calculate vectors from the sources to the pen and thereby generate representations of the symbols being drawn inside the pen. Each sensor is selectively activated by a different one of the sources. Although the wavelength sources are depicted as scanning their beams, it is also possible to employ wavelength sources that employ fixed but diffuse beams.

In a similar manner, although the illumination sources are depicted as adjacent to the writing surface and the detectors on the pen, it is also possible to arrange the illumination sources on the exterior of the pen near the writing end and the detectors on or adjacent the edges of a fixed writing surface. For example, an IR LED ring could be mounted on the exterior of the pen near the writing end and an appropriate linear array of CCD devices mounted along the X and Y axis of the writing surface. Each CCD array may contain a battery, digitizer, and transmitter, or the X and Y linear arrays may employ the same battery, digitizer, and transmitter. The CCD devices are employed to detect the position of the radiation from the source on the pen and, accordingly, detect the symbols associated with the writing of the pen. The signals from the CCD arrays are transmitted to a separate receiver in the pen computer which provides the signals to the recognition chip.

Referring now to FIG. 8, there may be seen an alternate depiction of a plurality of illumination sources having different wavelengths at different locations adjacent to the writing surface. More particularly, there may be seen three illumination sources having at least two different wavelengths that are pulsed in a particular sequence to allow 360° detectors for each wavelength within the pen computer near the writing end of the pen to determine the motion of the pen and thereby the symbols being written by the pen. One wavelength source is fixed and acts as a reference point and is pulsed before the other two sources; the other two sources may employ the same or different wavelengths.

Many other variations and modifications may be made in the techniques and apparatus hereinbefore described, by those having experience in this technology, without departing from the concepts of the present invention. Accordingly, it should be clearly understood that the apparatus depicted in the accompanying drawings and referred to in the foregoing description are illustrative only and are not intended as limitations on the scope of the invention.

What is claimed is:

1. A writing apparatus, comprising:
   at least one detector for sensing a position of a writing tip of said writing apparatus and for generating data representative of said position;
   at least one processor for processing said data and providing processed data as an output;
   a memory for storing said processed data outputted by said processor;
   a transmitter for transmitting said processed data stored in said memory said transmitter including a mode switch to control the transmission of said processed data; and
   a power source for providing operating power to said at least one detector, said at least one processor, said memory, and said transmitter.

2. An apparatus for collecting and recognizing written data, comprising:
   at least one detector for sensing a position of a writing tip of said apparatus and for generating data representative of said position;
   a recognition chip for processing said data and converting said data into recognizable symbols;
   a memory for storing said recognizable symbols;
   a transmitter for transmitting said recognizable symbols stored in said memory said transmitter including a mode switch to control the transmission of said recognizable symbols; and
   a power source for supplying operating power to said at least one detector, said recognition chip, said memory and said transmitter.

3. The apparatus as in claim 2, wherein said apparatus further comprises a general purpose processor for controlling modes of operation of said recognition chip, said memory, and said transmitter.

4. The apparatus as in claim 2, wherein said apparatus further comprises an exterior indication for indicating when said memory is substantially full.

5. The apparatus as in claim 2, wherein said apparatus further comprises an exterior indication for indicating when said power source is substantially depleted.

6. The apparatus as in claim 2, wherein said apparatus further comprises a solar panel positioned on the exterior of said apparatus for providing power to said power source.

7. The apparatus as in claim 2, wherein said apparatus further comprises a multi-pin plug positioned on the exterior of said apparatus and interconnected with said recognition chip.

8. The apparatus as in claim 2, wherein said power source comprises a DC battery.

9. The apparatus as in claim 2, wherein said recognition chip comprises a collection processor and at least one recognition processor.

10. The apparatus as in claim 2, wherein said memory comprises an emergency battery for powering said memory upon loss of power from said power source.

11. The apparatus as in claim 9, wherein said recognition chip further comprises a second memory for storing programs and libraries for use by said collection and said at least one recognition processors.

12. The apparatus as in claim 11, wherein said apparatus is a pen.

13. The apparatus as in claim 11, wherein said recognition chip further comprises CMOS circuits.

14. The apparatus as in claim 12, wherein said at least one detector comprises a plurality of CCDs disposed adjacent to said writing tip of said pen.

15. The apparatus as in claim 14, wherein said apparatus further comprises a plurality of lenses associated with said plurality of CCDs for providing said CCDs with a field of view adjacent to said writing tip of said pen.

16. The apparatus as in claim 15, wherein said apparatus further comprises an LED for illuminating said CCDs.

17. The apparatus as in claim 12, wherein said at least one detector comprises a track ball for contacting a writing surface and for attaching to said pen to rotate about an axis of said pen.

18. The apparatus as in claim 14, wherein said apparatus further comprises a plurality of lenses associated with said plurality of CCDs for providing said CCDs with an unrestricted field of view adjacent to said pen and for forming a portion of an exterior of said pen.

19. The apparatus as in claim 18, wherein said apparatus further comprises at leat two sources of illumination having different wavelengths and positioned adjacent to a preselected writing surface and to detect said data.

20. The apparatus as in claim 2, wherein said apparatus further comprises:
- a second transmitter for transmitting said data from said at least one detector, and
- a receiver for receiving transmissions from said second transmitter and providing said received data to said recognition chip.

* * * * *